United States Patent [19]

Needle et al.

[11] Patent Number: 6,055,077
[45] Date of Patent: Apr. 25, 2000

[54] MULTIMEDIA DISTRIBUTION SYSTEM USING FIBER OPTIC LINES

[75] Inventors: Jack Needle, Dix Hills; Dimitrios Kokkinos, Flushing, both of N.Y.

[73] Assignee: Nynex Science & Technology, Inc., White Plains, N.Y.

[21] Appl. No.: 08/806,090

[22] Filed: Feb. 25, 1997

[51] Int. Cl.$^7$ .................................................. H04J 14/02
[52] U.S. Cl. ................. 359/125; 359/128; 348/6
[58] Field of Search .................... 359/125, 128, 359/133, 137, 167; 348/6–7

[56] References Cited

U.S. PATENT DOCUMENTS

| | | | |
|---|---|---|---|
| 4,627,105 | 12/1986 | Ohashi et al. | 455/612 |
| 4,891,694 | 1/1990 | Way | 358/86 |
| 4,994,909 | 2/1991 | Graves et al. | 358/86 |
| 5,111,323 | 5/1992 | Tanaka et al. | 359/139 |
| 5,136,411 | 8/1992 | Paik et al. | 359/125 |
| 5,202,780 | 4/1993 | Fussganger | 359/125 |
| 5,221,983 | 6/1993 | Wagner | 359/125 |
| 5,309,564 | 5/1994 | Bradley et al. | 395/200 |
| 5,387,927 | 2/1995 | Look et al. | 348/6 |
| 5,457,560 | 10/1995 | Sharpe et al. | 359/137 |
| 5,483,277 | 1/1996 | Granger | 348/6 |
| 5,517,232 | 5/1996 | Heidemann et al. | 348/7 |

*Primary Examiner*—Kinfe-Michael Negash
*Attorney, Agent, or Firm*—Straub & Pokotylo; Michael P. Straub

[57] ABSTRACT

System for distributing multimedia information from a central office to multiple subscriber premises includes an optical backbone for transmitting a plurality of optical bands from the central office into a vicinity of the subscriber premises. A controllable switch, positioned outside the subscriber premises, selects a subset of the plurality of optical bands and blocks others that are not contained within the subset, inducing the subset onto an optical transmission pathway. A receiver positioned within the subscriber premises receives at least one optical band of the subset. The controllable switch, in various embodiments, limits the information received at a subscriber premises to only the information to which the subscriber subscribes. In this manner, the need to scramble signals to prevent theft of services is eliminated, since subscribers only receive the services to which they subscribe.

36 Claims, 4 Drawing Sheets

MULTIMEDIA DISTRIBUTION SYSTEM USING FIBER OPTIC LINES

FIELD OF INVENTION

The present invention relates to a multimedia system which distributes information from a central station to a plurality of subscribers and in particular, to a band switchable system which selectively distributes information to a plurality of subscribers.

DESCRIPTION OF THE PRIOR ART

With increasing bandwidths available on fiber optic communication paths, information providers are now capable of delivering a broader range of information, i.e., high definition video, to a subscriber premises. However, even with advancements in optical fiber telecommunication technology, theft of services remains a growing concern among information providers (e.g., cable television). The problem involves the fact that once a central station distributes signals in a general manner to a subscriber premises, the central station loses control of the signals. As a result, such signals are exposed to theft which results in a loss of revenue.

Presently, one approach to remedy the theft problem is to transmit scrambled signals or channels to each subscriber's premises. Each subscriber premises is equipped with a smart set top box to descramble those signals or channels ordered by the subscriber. Such systems however require additional equipment, specifically scramblers and descramblers, which increases their overall cost. Moreover, intelligent set top boxes that permit theft of services are presently available on the black market. Such set tops are capable of descrambling all scrambled signals transmitted to the subscriber premises, thereby allowing the subscriber access to those signals or channels.

Another approach to remedy the problem is found in U.S. Pat. No. 4,994,909 (Graves et al., hereinafter Graves). Graves provides a video signal distribution system that includes a services switching device and an optical network interface (ONI) for selecting particular signals for delivery to a subscriber. The services switching device employs multiplexers for producing time-division multiplexed (TDM) signals. Because the processing and routing of TDM signals is typically accomplished utilizing electronics, a drawback of the Graves system is a need for optical-to-electrical and electrical-to-optical conversion and for controlled environmental vaults, power back-up and maintenance.

A better multi/demultiplexing technique that employs optical rather than electrical multiplexing involves the utilization of wavelength division multiplexing (WDM). WDM provides significant advantages over TDM. Specifically, wavelength multiplexed channels can be separated and combined passively, independently of the format and bit rate of the data being transferred. An example of a fiber optic subscriber loop architecture utilizing WDMs is found in U.S. Pat. No. 5,221,983 (Wagner). However, such subscriber-type systems employing WDMs neither provides or suggests any mechanism for selecting particular signals for delivery to a subscriber premises.

Accordingly, it is an object of the present invention to provide a fiber optic subscriber loop architecture, based on WDM techniques, which is capable of selectively transmitting only those bands ordered by the subscriber to the subscriber premises.

It is a further object of the invention to eliminate the need for scramblers and descramblers at the subscriber premises and, thus, reduce the overall cost of the system.

Another object of the invention is to prevent theft of information services.

SUMMARY OF THE INVENTION

A system distributing multimedia information from a central office to a plurality of subscriber premises and incorporating the invention, includes an optical backbone for transmitting a plurality of optical bands from the central office into a vicinity of the subscriber premises. A switch, positioned exterior to the subscriber premises and coupled to the optical backbone, selects a subset of said plurality of optical bands and blocks others of the optical bands that are not contained within said subset, inducing said subset onto an optical transmission pathway. A receiver, coupled to said optical transmission pathway and positioned within the subscriber premises, receives at least one optical band of said subset.

The present invention provides an improved fiber optic subscriber loop architecture which reduces the overall cost of the system and prevents theft of services. Such a system selectively transmits only information ordered by the subscriber to the subscriber premises and, thus, eliminates the need for scramblers (at the central office or network node) and descramblers (at the subscriber premises). This results in a reduction in equipment and cost of the overall system. Such an arrangement also prevents unauthorized use or access (i.e., theft) of information services by a subscriber premises.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
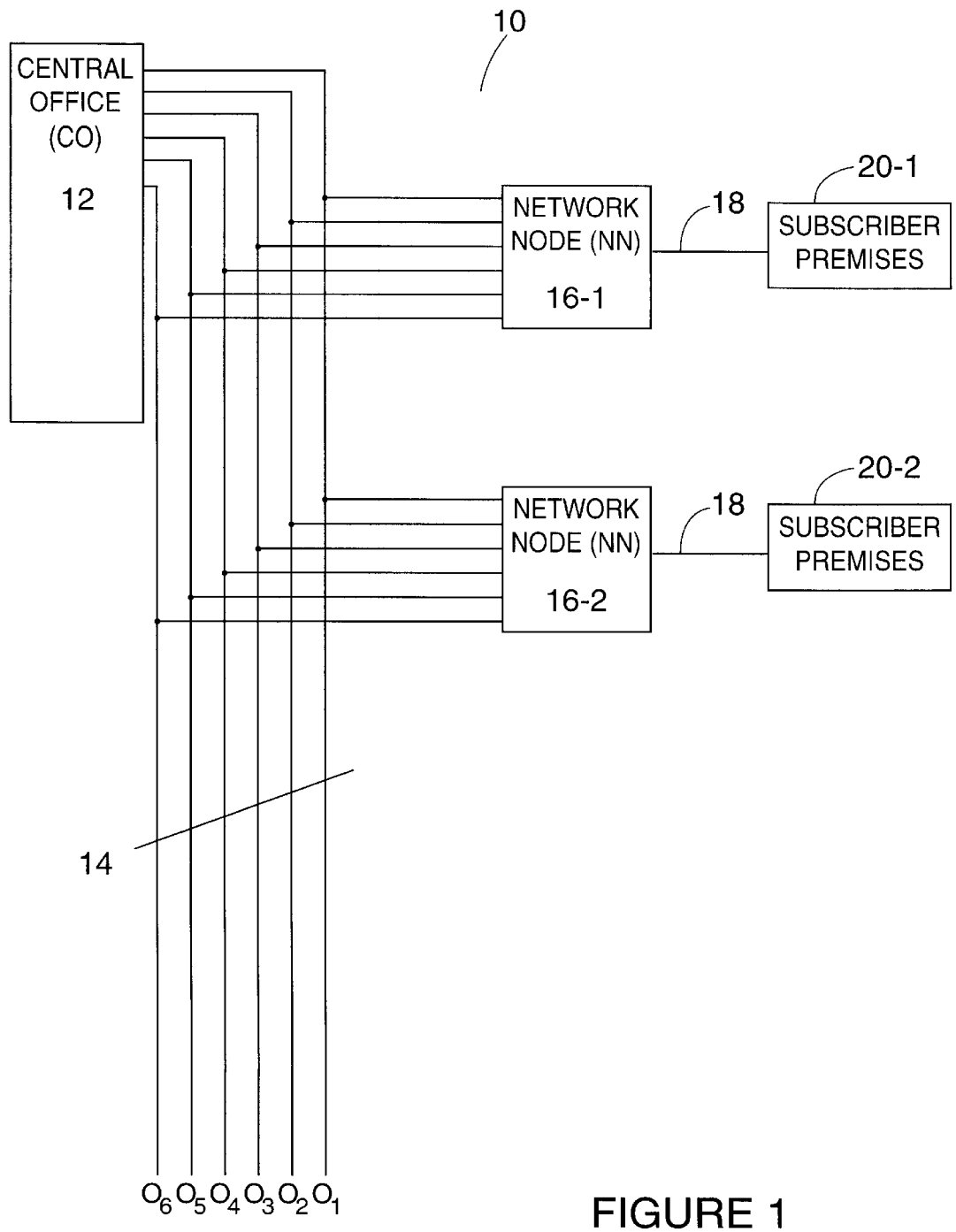
FIG. 1 is a block diagram of a fiber optic subscriber loop system with a central office that cooperates with a plurality of network nodes to provide selected information services to a plurality of subscriber premises.

FIG. 1 is a block diagram of an information distribution system 10 in accordance with the present invention. Information distribution system 10 includes a central office 12 which is connected by fiber optic feeder cable 14 to a plurality of network nodes (NN) 16-1, 16-2, . . . etc. Each network node 16-1, 16-2 is connected by a fiber optic line 18 to a corresponding subscriber premises 20-1, 20-2. As shown in FIG. 1, each network node 16-1, 16-2 is positioned exterior to a corresponding subscriber premises 20-1, 20-2.

At central office 12, a full band of downstream information, comprising six optical bands 01 through 06, is transmitted to each network node 16-1, 16-2 via fiber optic cables 14. Each network node 16-1, 16-2 selects a subset of bands 01 through 06 entitled by its respective subscriber premises 20-1, 20-2 (i.e., selects only those channels ordered by the subscriber). Such selected bands are then combined and transmitted to the corresponding subscriber premises 20-1, 20-2, across a single fiber optic line 18.

Figure 2:
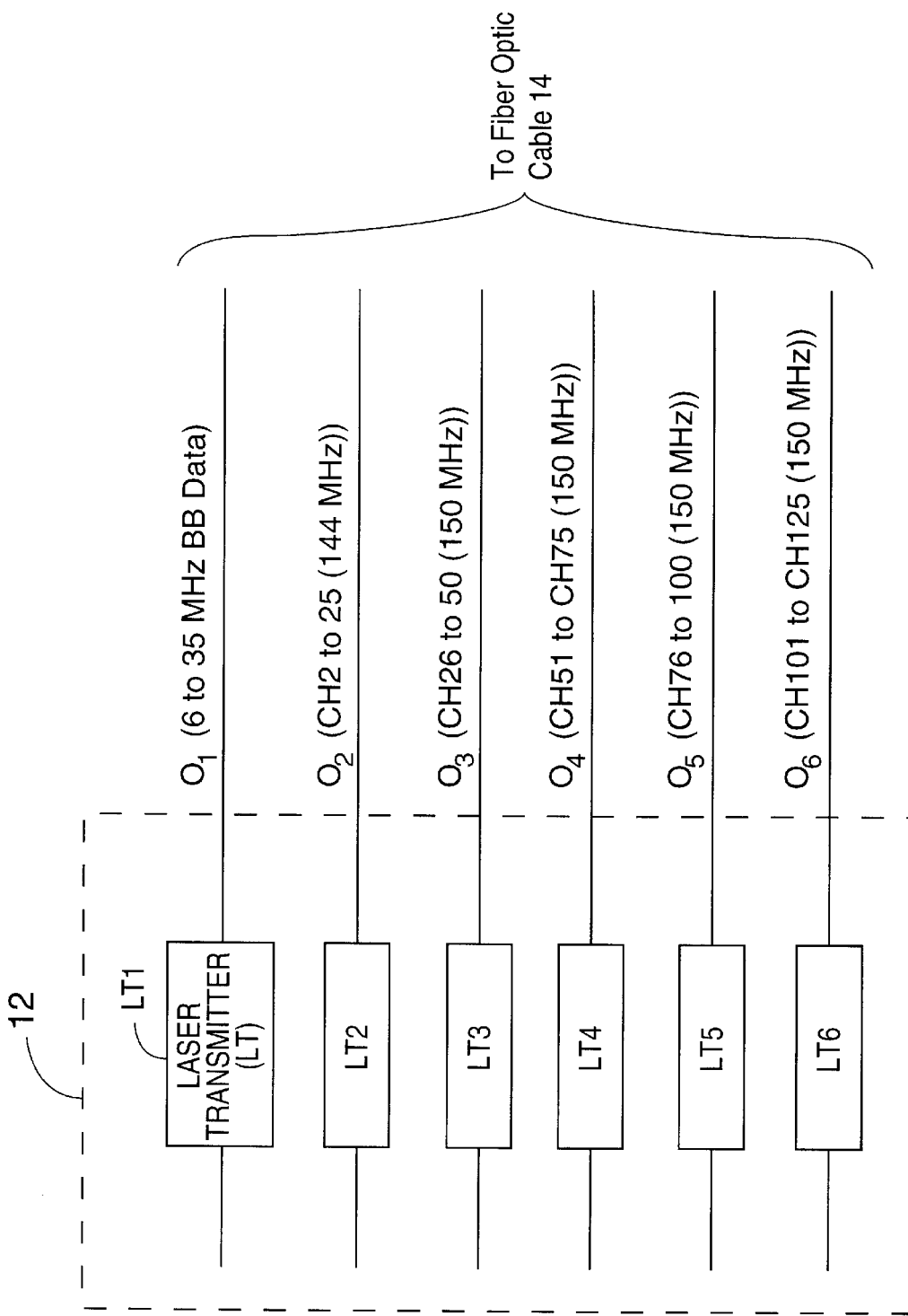
FIG. 2 is a block diagram of a central station which implements the invention hereof.

FIG. 2 shows a block diagram of central office 12 where electrical signals are converted to optical signals using laser transmitters, i.e., laser diodes, for light sources in the central to remote direction. Laser transmitters offer the linear performance characteristic required for the transmission of analog color signals and a higher frequency response than alternative LED light sources. Each laser transmitter generates a carrier wavelength corresponding to a different color. Signals are then modulated onto different carrier wavelengths for downstream transmission. Such modulation methods are commonly understood in the art and will not be discussed in further detail herein.

In the preferred embodiment of information distribution system 10, central station 12 employs a full band from 5 MHz to 1000 MHz, which is divided into six optical bands 01 through 06, for transmitting downstream information to each network node 16 (FIG. 1). The electrical signals from each band are converted into optical signals, 01 through 06, by modulating six laser transmitters LT1 through LT6 at different wavelengths corresponding to different colors. After downstream information is modulated onto optical bands 01 through 06, the optical bands are then transmitted to each network node 16 (FIG. 1), via optic feeder cables 14.

The nature and purpose of each optical band, 01 through 06, is described herein (FIG. 2). Specifically, optical band 01 comprises the frequency domain of 5 MHz to 35 MHz and is preferably utilized for bi-directional data communication between central office 12 and subscriber premises 20. Optical bands 02 through 06 carry audio/video information for use by a television receiver, located at subscriber premises 20. Optical band 02, having a bandwidth of 144 MHz, carries information corresponding to channels 2 through 25; optical band 03, having a bandwidth of 150 MHz, carries downstream information corresponding to channels 26 to 50; optical band 04, having a bandwidth of 150 MHz, carries downstream information corresponding to channels 51 through 75; optical band 05, having a bandwidth of 150 MHz, carries downstream information corresponding to channels 76 to 100; and optical band 06, having a bandwidth of 150 MHz, carries downstream information corresponding to channels 101 to 125. Although information distribution system 10 utilizes six optical bands for transmitting downstream information, any number of optical bands or any bandwidth may be utilized as desired. For instance, eight, sixteen and thirty-two optical bands are typically employed in the industry for downstream transmission.

Figure 3:
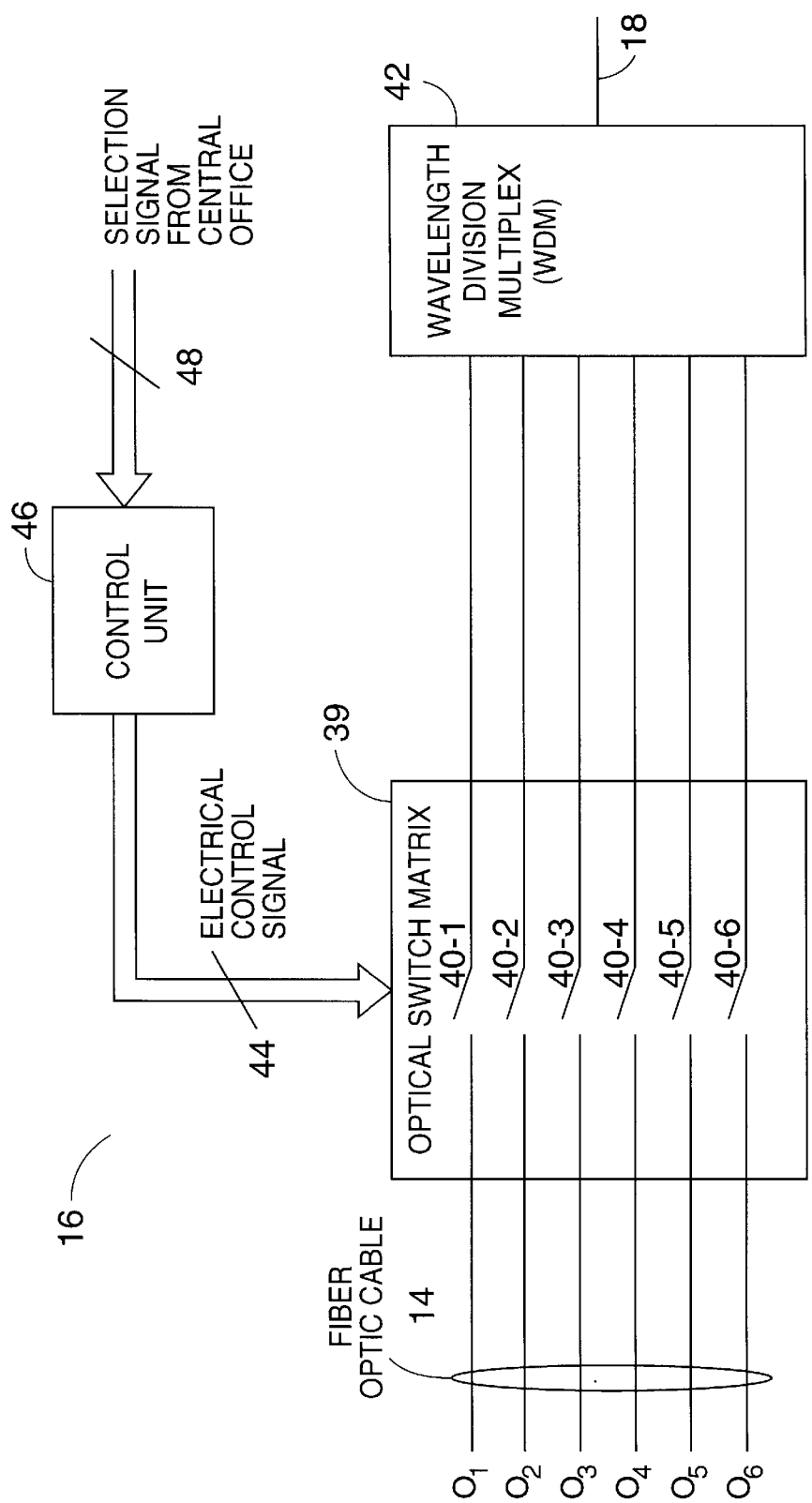
FIG. 3 is a block diagram of a network node which implements the invention hereof.

FIG. 3 illustrates a network node 16 which includes an optical switch matrix 39 having optical switches 40-1 through 40-6 corresponding to optical bands 01 through 06. Optical bands 01 through 06 are received by network node 16, via optical cable feeder 14, and are respectively coupled to optical switches 40-1 through 40-6. Optical switches 40-1 through 40-6 can be controlled by electrical control signals to select or deselect any optical band 01 through 06 (via optical switches 40-1 through 40-6) destined for subscriber premises 20.

Optical switches 40-1 through 40-6 can be controlled from a remote location, i.e., central office 12, or pre-programmed to select or de-select any optical band 01 through 06 destined for subscriber premises 20. Such an arrangement can be accomplished in the following manner. Each network node 16 may include a microprocessor-based control unit 46 which is either pre-programmed with the subscriber's order or receives selection signals 48 (i.e., codes) from central office 12. Selection signals 48 may be received via telephone line, Radio Frequency (RF) or optic fiber cables 14. Upon receipt of selection signals 48, control unit 46, utilizing a digital-to voltage (D/V) converter, generates electrical switch control signals 44 in accord with selection signals 48. Optical switch matrix 39 receives electrical control signals 44 and initiates the completion of the requested optical path connection, thus allowing only those optical bands ordered by subscriber premises 20 to be transmitted to subscriber premises 20.

Network node 16 further includes a wavelength division multiplexer (WDM) 42 which receives the selected optical bands (i.e., a subset of 01 through 06) from optical switch matrix 39. WDM 42 combines the selected optical bands into a single optical signal which is then transmitted across fiber optic line 18 to respective subscriber premises 20.

It is important to understand that network node 16 is positioned exterior to subscriber premises 20 (and not at subscriber premises 20) to prevent theft of services at subscriber premises 20. Network node 16 can be either mounted and installed at central office 12 or on a pole, vault or in a node configuration near subscriber premises 20. As can be appreciated by those skilled in the art, the switching function provided by network node 20 allows central office 12 to maintain control over downstream information (i.e., 01 through 06) by transmitting only those bands ordered by subscriber premises 20 to subscriber premises 20. Network node 16 eliminates the need for scramblers and descramblers at central office 12 and subscriber premises 20 and, thus, reduces the overall cost of the system. Such a system also prevents subscriber premises 20 from utilizing a black market set top box (i.e., an intelligent set top with descrambling capabilities) to steal information services.

Figure 4:
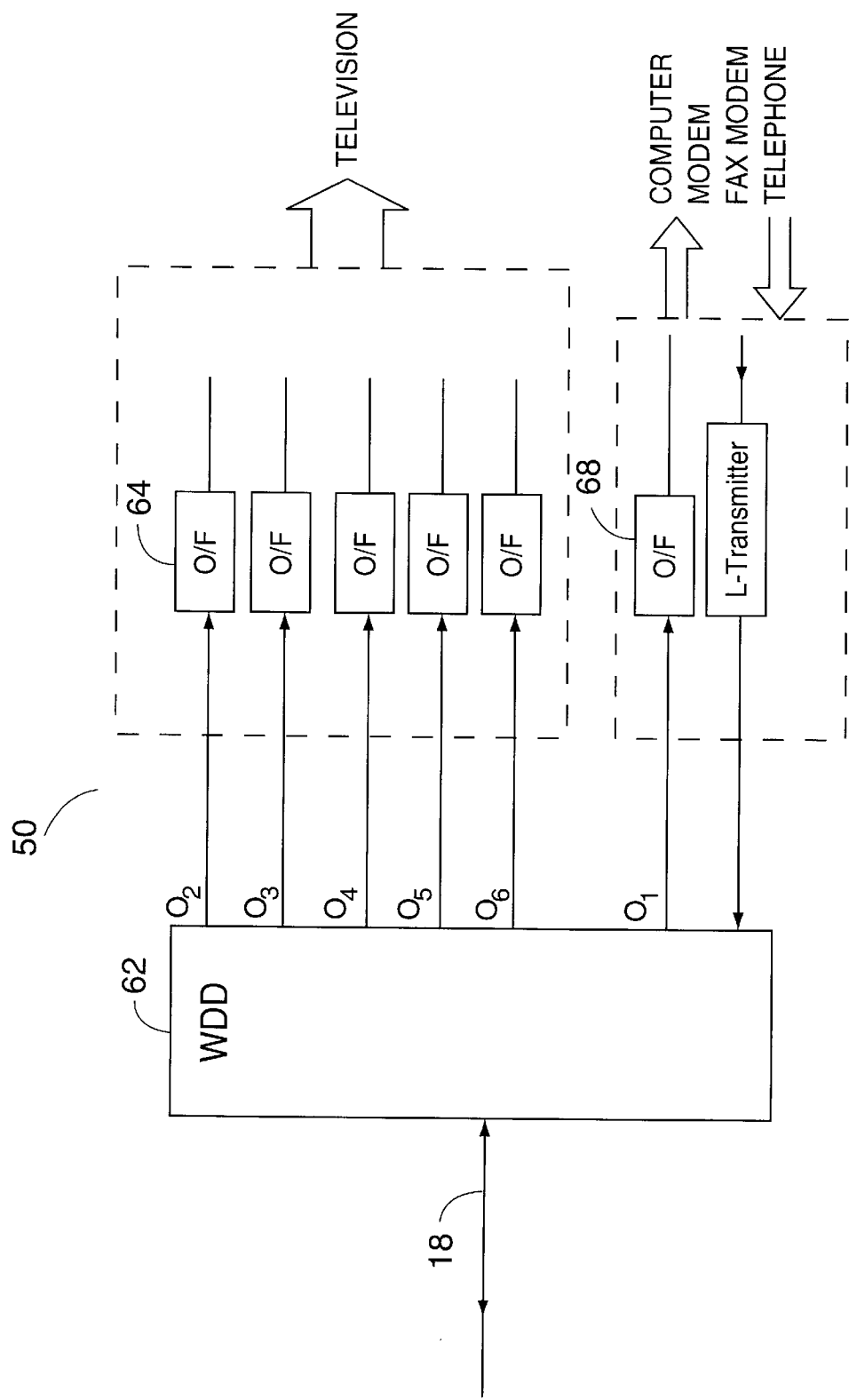
FIG. 4 is a block diagram of a subscriber premises which implements the invention hereof.

As illustrated in FIG. 4, subscriber premises 20 has a set top box 50 which receives the single optical signal (i.e., selected downstream information) from respective network node 16, via fiber optic line 18. Set top box 50 includes a Wavelength Division Demultiplexer (WDD) 62 and a plurality of low bandwidth Optical/Frequency (O/F) converters.

WDD 62, coupled to fiber optic line 18, is utilized to separate optical bands 02 through 06. WDD 62 receives the single optical signal and separates it back into the selected optical bands, in particular, a subset of optical bands 02 through 06. Each selected optical band is then converted into RF, by a corresponding low bandwidth O/F converter 64.

WDD 62 is also utilized to separate optical band 01 (i.e., 5 to 35 MHz BB data) from the single optical signal. As previously mentioned, optical band 01 is preferably utilized for both upstream and downstream data transmission between central office 12 and subscriber premises 20. Such an arrangement can be accomplished by having optical band 01 include both modulated and unmodulated wavelengths. The modulated wavelengths carry downstream information from central office 12 to subscriber premises 20; and the unmodulated wavelengths are utilized at subscriber 20 to transmit upstream information to central office 12. Subscriber premises 20 includes a laser transmitter 70 for modulating upstream information onto unmodulated wavelengths of optical band 01. Such a two-way data link can be utilized by a computer, fax machine, telephone, modem at subscriber 20.

It should be understood that, at subscriber premises 20, set top box 50 does not operate over the entire band, i.e., the single optical signal. That is to say, set top box 50 does not convert the entire single optical signal into RF. Instead, the single optical signals are separated by WDD 62, and low bandwidth O/F converters 64, 68 are then employed to convert the selected bands into RF. Such an implementation reduces the overall cost of set top box 50 by eliminating the need to operate over the entire band at the same time. More importantly, such an arrangement allows information distribution system 10 to meet the required dynamic range and linearity specifications.

Instead of having a set top box for each television set at subscriber premises 20, set top box 50 can also be configured in the basement (or any other convenient location) of subscriber premises 20 to convert all delivered bands at once. The converted bands (i.e., channels) can then be transmitted to each television set in the clear, over cables. Such an arrangement eliminates the need for multiple set top boxes for those subscriber premises having more than one television set and, thus, may decrease the overall cost of the equipment at those subscriber premises.

The invention having thus described with particular reference to the preferred forms thereof, it will be obvious that various changes and modifications may be made therein without departing from the spirit and scope of the invention as defined in he appended claims.

What is claimed is:

1. A system for communicating information between a central office and a plurality of subscriber premises comprising:

an optical backbone for transmitting a plurality of optical bands;

a first optical transmission pathway extending into a first one of said subscriber premises;

a first controllable switching device coupled between said optical backbone and said first optical transmission pathway, for passing, in response to a control signal, a first subset of said plurality of optical bands, and for blocking at least one of said plurality of optical bands to prevent the blocked one of the optical bands from being included in said first subset; and a first receiver located at said first one of said subscriber premises, coupled to said first optical transmission pathway, for receiving at least one optical band of said first subset.

2. The system as recited in claim 1, wherein the first switching device is an optical switching device, the system further comprising:

means for controlling the first controllable switching device to block all optical bands, used to provide services to which a first subscriber located at the first one of the subscriber premises does not subscribe, from being transmitted via said first optical transmission pathway into the first one of the subscriber premises.

3. The apparatus of claim 2, further comprising:

a second optical transmission pathway extending into a second one of said subscriber premises;

a second controllable switching device coupled between said optical backbone and said second optical transmission pathway, for passing, in response to an additional control signal, a second subset of said plurality of optical bands, and for blocking at least one of said plurality of optical bands to prevent the blocked one of the optical bands from being transmitted to said second one of said subscriber premises; and a second receiver located at said second one of said subscriber premises, coupled to said second optical transmission pathway, for receiving at least one optical band of said second subset.

4. The system as recited in claim 3, wherein the first switching device is an optical switching device, the system further comprising:

means for controlling the second controllable switching device to block all optical bands, used to provide services to which a second subscriber located at the second one of the subscriber premises does not subscribe, from being transmitted via said second optical transmission pathway into the second one of the subscriber premises.

5. The system of claim 3, wherein the first controllable switching device is located in the vicinity of the first one of said subscriber premises and the second switching device is located in the vicinity of the second one of said subscriber premises.

6. The system of claim 3, wherein the first and second controllable switching devices are installed at the central office.

7. The system of claim 6, wherein the first and second optical transmission pathways are each single fiber optic lines.

8. The system as recited in claim 1, further comprising control means, associated with said first switching device, for receiving said control signals from a remote location and for controlling said first switching device in accord with said control signals; and wherein said first switching device includes at least one optical switch.

9. The system as recited in claim 1, wherein said control signal is an electrical signal; and wherein said first switching device includes means for receiving said electrical control signal.

10. The system as recited in claim 9, wherein said said switching device includes a wavelength division multiplexer for combining optical bands included in the first subset into a single optical signal.

11. The system as recited in claim 1, further comprising:

a laser transmitter located at the first one of said subscriber premises for transmitting information on said first optical transmission pathway.

12. The system as recited in claim 11, further comprising means, within said subscriber premises, for converting at least one optical band of said selected subset to radio frequency signals, said converting means including a law bandwidth optical-to-frequency converter.

13. The system of claim 1, wherein the first controllable switching device is located in the vicinity of, and external to, the first one of said subscriber premises.

14. The system of claim 1, wherein the first controllable switching device is installed at the central office.

15. The system of claim 14, wherein the first optical communication pathway is a single fiber optic line.

16. The system of claim 1, wherein all the optical bands passed by the first switching device include non-scrambled information.

17. A method of communicating information between an information provider and at least one subscriber premises, comprising the steps of:

utilizing a plurality of communication pathways to transmit information;

operating a first controllable switching device positioned between the information provider and a first subscriber premises to, in response to a first control signal, pass information transmitted on a first subset of the communication pathways and to block information included on ones of said plurality of communication pathways, so that information, corresponding to services which are not subscribed to by an entity at the first subscriber premises, is not transmitted to the first subscriber premises;

transmitting the information passed by the first switching device to the first subscriber premises using a first optical pathway positioned between the switching device and the first subscriber location; and converting information passed to the first subscriber premises as an optical signal into an electrical signal.

18. The method of claim 17, further comprising the step of:

transmitting information from the first subscriber to the information provider using the first optical pathway and an optical transmitter located at the first subscriber premises.

19. The method of claim 18, wherein the first optical pathway is a single fiber optic line.

20. The method of claim 18, further comprising the steps of:

operating a second controllable switching device positioned between the information source and a second subscriber premises to, in response to a second control signal, selectively pass information transmitted on a second subset of the communication pathways and to block information included on ones of said plurality of communication pathways, so that information, corresponding to services which are not subscribed to by an entity at the second subscriber premises, is not transmitted to the second subscriber premises, at least some of the information passed by the second controllable switching device being different than the information passed by the first controllable switching device;

transmitting the information passed by the second controllable switching device to the second subscriber premises using a second optical pathway positioned between the second controllable switching device and the second subscriber premises; and converting information passed to the second subscriber premises as an optical signal into an electrical signal.

21. The method of claim 20, further comprising the step of:

transmitting information from the second subscriber to the information provider using the second optical pathway and an optical transmitter located at the second subscriber premises.

22. The method of claim 21, wherein the information provider is a central office, the method further comprising the steps of:

locating the first controllable switching device at a location exterior to the first subscriber premises; and locating the second controllable switching device at a location exterior to the second subscriber premises.

23. The method of claim 21, wherein the information provider is a central office, the method further comprising the steps of:

locating the first and second controllable switching devices at the central office.

24. The method of claim 21, wherein the first and second optical pathways are each implemented using a single fiber optic line and wherein the first and second switching devices are optical switching devices.

25. The method of claim 24, wherein the transmitted information is analog information.

26. The method of claim 17, wherein the transmitted information is analog information.

27. The method of claim 17, wherein information transmitted on the first optical pathway includes video signals, all video signals transmitted on the first optical pathway being non-scrambled video signals.

28. A communication system, comprising:

a central office including a plurality of communication pathways used to transmit information;

a first controllable switching device coupled to the communication pathways for selectively passing, in response to a first control signal, a first subset of information transmitted on the communication pathways;

a first optical communication link coupled to the first switching device for transmitting the first subset of information;

a receiver located at a first subscriber premise coupled to the first optical communication link for converting at least a portion of the first subset of information transmitted as optical signals over the first optical communication link into electrical signals;

a second controllable switching device coupled to the communication pathways for selectively passing, in response to a second control signal, a second subset of information transmitted on the communication pathways;

a second optical communication link coupled to the second controllable switching device for transmitting the second subset of information; and a receiver, located at a second subscriber premise, coupled to the second optical communication link for converting at least a portion of the second subset of information transmitted as optical signals over the first optical communication link into electrical signals.

29. The system of claim 28, wherein the first and second controllable switching devices are located outside the first and second subscriber premises, respectively.

30. The system of claim 29, wherein the first and second controllable switching devices are optical switching devices.

31. The system of claim 26, wherein the first and second controllable switching devices are located in the central office.

32. The system of claim 31, wherein the first and second controllable switching devices are optical switching devices.

33. The system of claim 28, further comprising:

a laser transmitter, coupled to the first optical communication link and located at the first subscriber premise, for transmitting information over the first optical link.

34. The system of claim 33, further comprising:

a laser transmitter, coupled to the second optical communication link and located at the second subscriber premise, for transmitting information over the second optical link.

35. The system of claims 28, wherein information transmitted on the first optical pathway includes video signals, all video signals transmitted on the first optical pathway being non-scrambled video signals.

36. A system for distributing multimedia information from a central office to a plurality of subscriber premises comprising:

an optical backbone for transmitting a plurality of optical bands from said central office into a vicinity of said subscriber premises;

an optical transmission pathway extending into said subscriber premises;

switch means, positioned exterior to said subscriber premises and coupled between said optical backbone and said optical transmission pathway, for selecting a subset of said plurality of optical bands, for blocking others of said optical bands that are not contained within said subset, and for impressing said subset into an optical transmission pathway;

control means, associated with said switch means, for receiving control signals from a remote location and for controlling said switch means in accord with said control signals; and receiving means, coupled to said optical transmission pathway and positioned within said subscriber premises, for receiving at least one optical band of said subset.

* * * * *